(12) United States Patent
Wengrovitz et al.

(10) Patent No.: US 11,281,913 B2
(45) Date of Patent: Mar. 22, 2022

(54) METHOD FOR DISPLAY-BASED VIDEO ANALYTICS

(71) Applicant: Mutualink, Inc., Wallingford, CT (US)

(72) Inventors: Michael S. Wengrovitz, Concord, MA (US); Joseph R. Mazzarella, Tolland, CT (US)

(73) Assignee: Mutualink, Inc., Wallingford, CT (US)

( * ) Notice: Subject to any disclaimer, the term of this patent is extended or adjusted under 35 U.S.C. 154(b) by 0 days.

(21) Appl. No.: 17/192,259

(22) Filed: Mar. 4, 2021

(65) Prior Publication Data

US 2021/0264158 A1 Aug. 26, 2021

Related U.S. Application Data

(63) Continuation of application No. 15/401,862, filed on Jan. 9, 2017, now Pat. No. 10,943,123.

(51) Int. Cl.
| | |
|---|---|
| *G06K 9/00* | (2006.01) |
| *H04N 7/01* | (2006.01) |
| *H04N 7/10* | (2006.01) |
| *G06K 9/62* | (2006.01) |
| *G06K 9/46* | (2006.01) |

(Continued)

(52) U.S. Cl.
CPC .......... *G06K 9/00718* (2013.01); *G06K 9/46* (2013.01); *G06K 9/6267* (2013.01); *G06T 7/20* (2013.01); *G08B 13/19613* (2013.01); *H04L 63/0428* (2013.01); *H04N 7/01* (2013.01); *H04N 7/10* (2013.01); *H04N 7/18* (2013.01); *H04N 21/2347* (2013.01); *H04N 21/4223* (2013.01); *H04N 21/43635* (2013.01); *H04N 21/64322* (2013.01); *G06K 9/00771* (2013.01); *G06K 2009/00738* (2013.01); *G06T 2207/10016* (2013.01); *G06T 2207/30232* (2013.01); *G08B 13/19608* (2013.01); *G08B 13/19645* (2013.01)

(58) Field of Classification Search
None
See application file for complete search history.

(56) References Cited

U.S. PATENT DOCUMENTS

| 8,667,557 B2 | 3/2014 | Ou |
| 10,943,123 B2 | 3/2021 | Wengrovitz et al. |

(Continued)

OTHER PUBLICATIONS

International Preliminary Report on Patentability issued in related PCT application No. PCT/US2018/012987, dated Jul. 18, 2019 (13 pages).

(Continued)

*Primary Examiner* — Frederick D Bailey
(74) *Attorney, Agent, or Firm* — Sterne, Kessler, Goldstein & Fox P.L.L.C.

(57) ABSTRACT

The present disclosure is directed to a video surveillance system and method for performing display-based video analytics on video streams provided by internet protocol (IP) cameras and/or a video management system (VMS) over an IP network. Display-based video analytics can perform video analytics on the video streams without a direct connection to the IP network. Because the display-based video analytics can perform video analytics on the video streams without being directly connected to the IP network, the display-based video analytics can be more readily implemented in video surveillance systems with secure IP networks.

20 Claims, 11 Drawing Sheets

(51) Int. Cl.
*G06T 7/20* (2017.01)
*H04N 21/643* (2011.01)
*H04N 21/4363* (2011.01)
*H04N 21/4223* (2011.01)
*H04N 21/2347* (2011.01)
*H04L 29/06* (2006.01)
*G08B 13/196* (2006.01)
*H04N 7/18* (2006.01)

(56) References Cited

U.S. PATENT DOCUMENTS

| | | |
|---|---|---|
| 2002/0101512 A1 | 8/2002 | Klapman et al. |
| 2003/0122667 A1 | 7/2003 | Flynn |
| 2004/0075738 A1 | 4/2004 | Burke et al. |
| 2004/0161133 A1 | 8/2004 | Elazar et al. |
| 2007/0024705 A1* | 2/2007 | Richter ............ H04N 7/17318 348/142 |
| 2008/0052756 A1 | 2/2008 | Morishige et al. |
| 2009/0125954 A1 | 5/2009 | Ku |
| 2009/0189981 A1 | 7/2009 | Siann et al. |
| 2010/0123830 A1 | 5/2010 | Vunic |
| 2011/0090334 A1* | 4/2011 | Hicks, III ............ G08B 19/005 348/143 |
| 2011/0211069 A1* | 9/2011 | Sybesma ............... H04N 7/185 348/143 |
| 2012/0113265 A1 | 5/2012 | Galvin |
| 2012/0162505 A1 | 6/2012 | Vanderhoff et al. |
| 2013/0321623 A1 | 12/2013 | Roskowski |
| 2014/0139732 A1 | 5/2014 | Mraz et al. |
| 2015/0147052 A1 | 5/2015 | Zhou |
| 2015/0163412 A1 | 6/2015 | Holley et al. |

OTHER PUBLICATIONS

AVNET: "HDMI Input/Output Module", Product Brief, Dec. 31, 2015, retrievable at https://www.avnet.com/opasdata/d120001/medias/docus/53/AES-FMC-HDMI-CAM-G-HDMI-Input-Output-FMC-module-PB.pdf (2 pages).

Bernard, Ray, "The State of Security Video Analytics", Jul. 26, 2016, retrievable at https://www.securityindustry.org/wp-content/uploads/2017/11/The_State_of_Video_Analytics.pdf (20 pages).

* cited by examiner

METHOD FOR DISPLAY-BASED VIDEO ANALYTICS

CROSS-REFERENCE TO RELATED APPLICATIONS

This application is a continuation of U.S. patent application Ser. No. 15/401,862, filed Jan. 9, 2017, entitled Display-Based Video Analytics which is incorporated herein by reference in its entirety.

FIELD OF THE INVENTION

This application relates generally to video surveillance systems and, more particularly, to the implementation and use of video analytics in video surveillance systems.

BACKGROUND

Video surveillance involves remotely watching public or private spaces using video cameras. The demand for video surveillance continues to be strong for safety and security purposes in many areas, such as airports, maritime areas, railways, streets, stores, banks, and parking lots. To be useful for safety and security purposes, real-time analysis of surveillance video is typically required. Human operators can be used to monitor cameras in real-time and report events of significance. But studies have shown that humans are not well-suited to perform this task due to its repetitive nature and, in some cases, not suited at all due to the large number of video cameras in use by some surveillance systems.

To address this limitation of human operators, video analytics can be added to a video surveillance system. In general, video analytics involves analyzing video using algorithms that detect objects of interest (e.g., people or vehicles) and then recognize and/or track the objects of interest. Video analytics can further be used to indicate the presence of events of potential significance involving these objects. For example, a common goal of video analytics is to provide alerts to operators corresponding to various types of events.

One associated challenge is how to introduce or implement a video analytics system in a video surveillance system. A typical video surveillance system is comprised of multiple internet protocol (IP) cameras, a Video Management System (VMS), and a video receiving device that renders real-time and/or recorded video streams from one or more of the IP cameras or the VMS on a display. The IP cameras, the VMS, and the video receiving device interact over an IP network that is suitable for carrying the video streams from the IP cameras and/or from the VMS to the video receiving device. A video analytics system can be directly connected to the IP network such that IP packets carrying the video streams from the IP cameras and/or the VMS can be routed to the video analytics system for processing.

However, this form of direct connection can be cumbersome and can pose security challenges, especially where the IP network is a secure IP network. Typically, before a device can be attached to a secure IP network, the device must be checked for compliance with a governing security policy of the secure IP network and brought up to compliance where deviations are found. Also, if the device is connected to the Internet, either directly or indirectly, the device poses other potential risks to a secure IP network that must be assessed and addressed. The following description addresses alternate means that can simplify the integration of video analytics systems and video surveillance systems.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

1. Overview

The present disclosure is directed to a video surveillance system and method for performing display-based video analytics on video streams provided by internet protocol (IP) cameras and/or a video management system (VMS) over an IP network. Display-based video analytics can perform video analytics on the video streams without a direct connection to the IP network. Because the display based video analytics can perform video analytics on the video streams without being directly connected to the IP network, the display based video analytics can be more readily implemented in video surveillance systems with secure IP networks. These and other features of the present disclosure are described further below.

2. Exemplary Operating Environment

Figure 1:
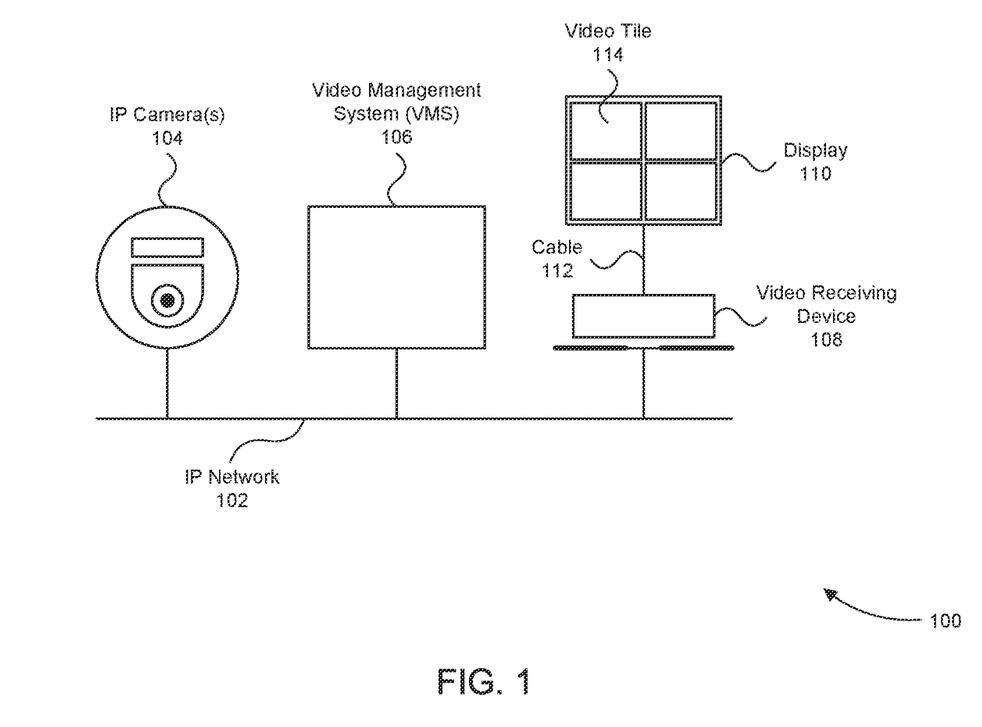
FIG. 1 illustrates an exemplary video surveillance system in which embodiments of the present disclosure can be implemented.

FIG. 1 illustrates an exemplary video surveillance system 100 in which embodiments of the present disclosure can be implemented. The video surveillance system 100 includes an internet protocol (IP) network 102, at least one IP camera 104, a video management system (VMS) 106, a video receiving device 108, and a display 110 coupled to the video receiving device 108 via a cable 112.

In operation, video surveillance system 100 can be used to remotely watch a public or private space for safety and/or security purposes. For example, video surveillance system 100 can be used for safety and/or security purposes in an airport, maritime area, railway, street, store, bank, or parking lot. IP camera 104 can capture video in one of these environments and transmit a video stream based on the captured video to VMS 106 and/or video receiving device 108 over IP network 102.

IP network 102 is a communication network that allows data to be transferred between the one or more devices coupled to the network. For example, IP camera 104 can send a video stream of the video it captures over IP network 102 to VMS 106. The video stream is encapsulated in a series of IP packets that include a destination IP address uniquely identifying VMS 106 among the other devices coupled to IP network 102. In general, each device coupled to IP network 102 is typically assigned a unique IP address to allow IP packets to be routed to/from the device. It should be noted that, although the devices in FIG. 1 are shown as being directly coupled to IP network 102 using a single cable, in other embodiments one or more of the devices in FIG. 1 can be coupled using additional cables, using wireless connections (e.g., via an IEEE 802.11 network), and using one or more switches and/or routers.

VMS 106 can receive video streams from IP camera 104 over IP network 102, store the video streams in one or more memory storage units (not shown), and manage distribution of the video streams stored in the one or more memory storage units to one or more viewers or video receiving devices, such as video receiving device 108.

In one embodiment, VMS 106 and video receiving device 108 form one device as opposed to two separate devices as shown in FIG. 1. In another embodiment, video receiving device 108 is a separate device from VMS 106 and either receives a video stream of video captured by IP camera 104 from VMS 106 or receives the video stream directly from IP camera 104. Video receiving device can be, for example, a personal computer (PC) with one or more processors executing software stored in a memory that allows an operator of video receiving device 108 to interact with IP camera 104 and/or VMS 106 to receive video streams.

Video receiving device 108 is configured to process a video stream of video captured by IP camera 104 to provide the video stream in a format for display. For example, as shown in FIG. 1, video receiving device 108 can provide the formatted video stream to display 110 via cable 112. Cable 112 can be, for example, a High-Definition Multimedia Interface (HDMI) display cable, a Digital Visual Interface (DVI) display cable, or a Video Graphics Array (VGA) display cable. An operator of video surveillance system 100 can view the rendered video stream on display 110. Video receiving device 108 specifically receives the video stream in IP packets over IP network 102 and reformats the received video stream for display by display 110. The reformatted video stream can be in a format suitable for transfer over interfaces such as HDMI, DVI, and VGA.

In the embodiment where multiple IP cameras 104 are used by video surveillance system 100, video receiving device 108 can format the video streams from two or more of the multiple IP cameras 104 for display in a tiled format by display 110. For example, video receiving device 108 can simultaneously display each video stream in a separate video tile 114 on display 110.

As mentioned above, in order for video surveillance system 100 to be useful for many safety and security purposes, real-time analysis of the surveillance video captured by IP camera 104 is typically required. Human operators can be used to monitor video cameras in real-time and report events of significance. But studies have shown that humans are not well-suited to perform this task due to its repetitive nature and, in some cases, are not suited at all due to the large number of video cameras in use by some surveillance systems.

To solve this problem with human operators, video analytics can be added to video surveillance system 100. In general, video analytics involves analyzing video using algorithms that detect objects of interest (e.g., people or vehicles) and then recognize and/or track the objects of interest. Video analytics can further be used to indicate the presence of events of potential significance (e.g., suspicious behavior or emergency situations) involving these objects. For example, a common goal of video analytics is to provide alerts to operators of these events.

Figure 2:
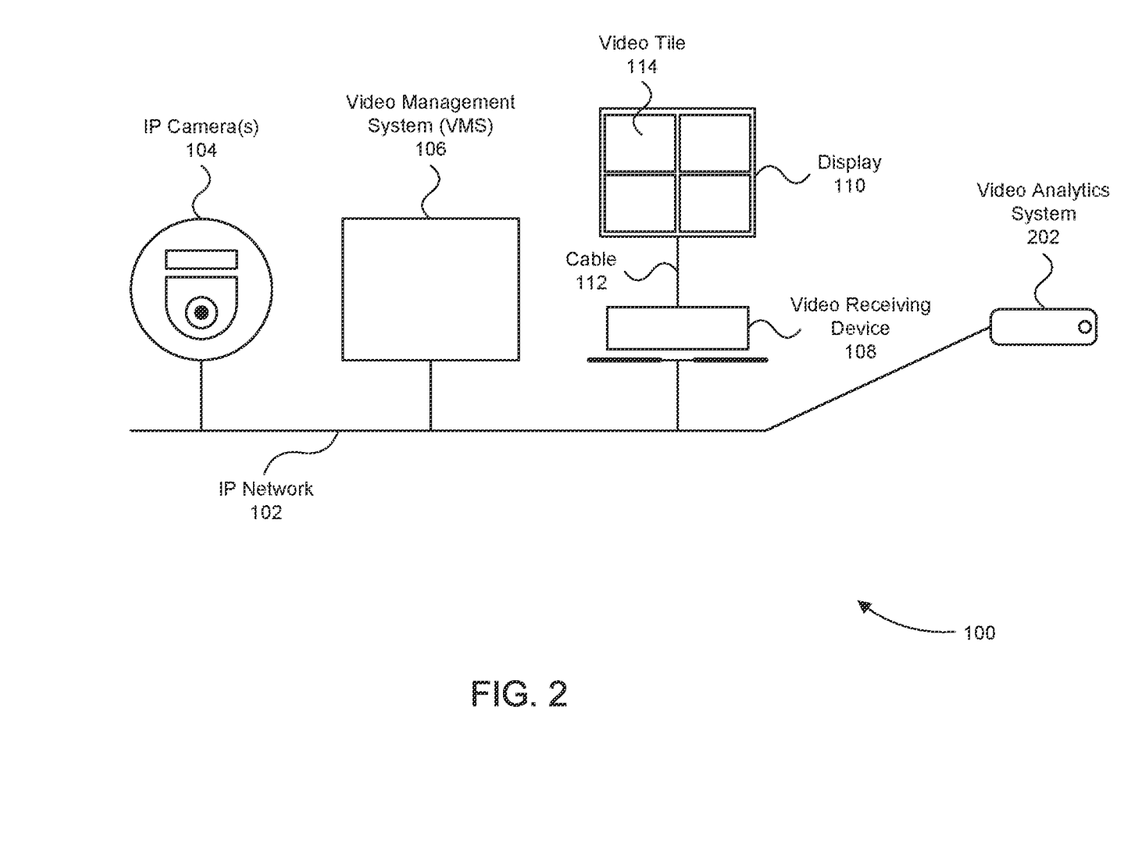
FIG. 2 illustrates a video surveillance system that implements video analytics.

One issue with video analytics is how to introduce or implement a video analytics system in a video surveillance system, such as video surveillance system 100. As shown in FIG. 2, a video analytics system 202 can be directly connected to IP network 102 such that IP packets carrying a video stream from IP camera 104 or VMS 106 can be routed to video analytics system 202 for processing. However, this form of direct connection can be cumbersome and/or can pose challenging security implications where IP network 102 is a secure IP network.

3. Display Based Video Analytics

Figure 3:
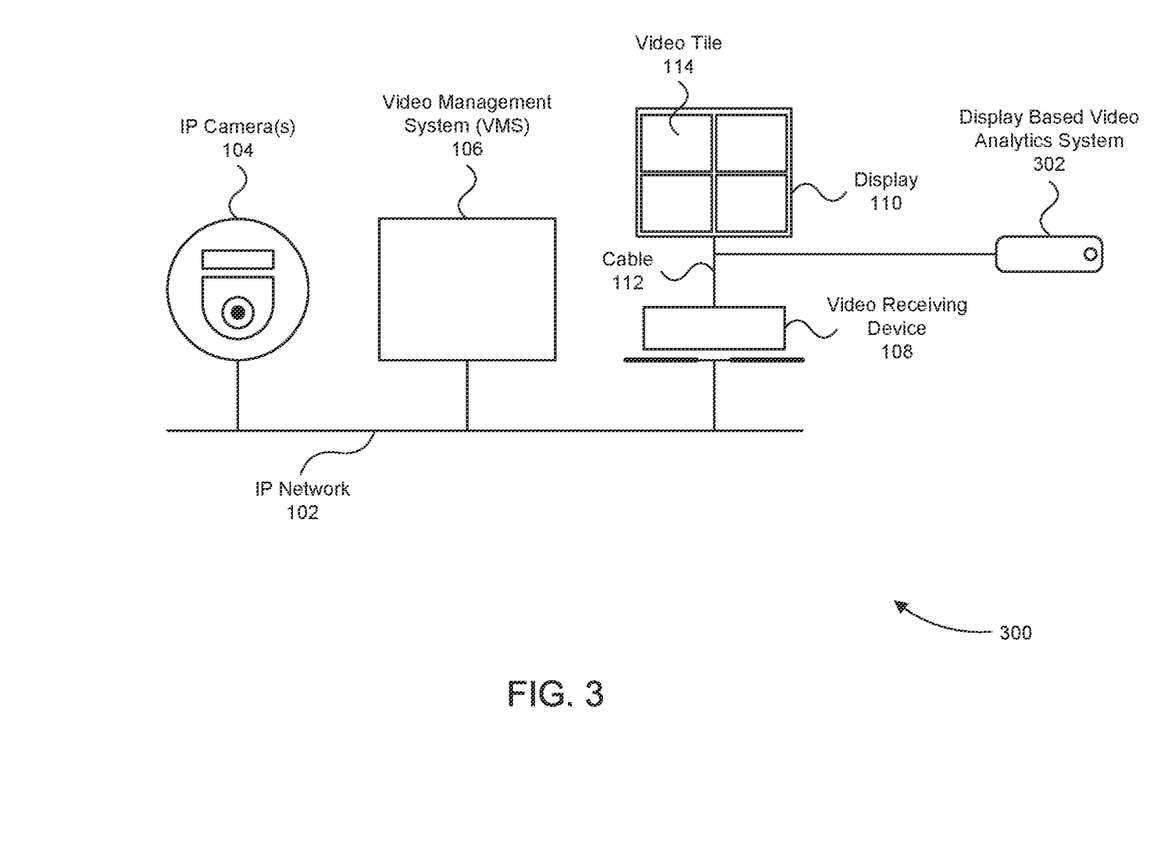
FIG. 3 illustrates a video surveillance system that implements display based video analytics in accordance with embodiments of the present disclosure.

FIG. 3 illustrates a video surveillance system 300 that implements display based video analytics in accordance with embodiments of the present disclosure. Video surveillance system 300 has a similar configuration and mode of operation as video surveillance system 100 described above in regard to FIG. 1 with the exception that video surveillance system 300 further includes a display based video analytics system 302.

Display based video analytics system 302 can be used to perform video analytics on a video stream received by video receiving device 108 from IP camera 104 and/or VMS 106 without a direct connection to IP network 102. As described above, video receiving device 108 processes the video stream of video captured by IP camera 104 to provide the video stream in a format for display 110. For example, video receiving device 108 can provide the formatted video stream to display 110 via cable 112. Cable 112 can be a High-Definition Multimedia Interface (HDMI) display cable, a Digital Visual Interface (DVI) display cable, or a Video Graphics Array (VGA) display cable to name a few examples. Display based video analytics system 302 subsequently receives the video stream in the format for display 110 via cable 112 from video receiving device 108. After receiving the video stream in the format for display 110, display based video analytics system 302 can perform video analytics on the video stream. It should be noted that the video stream can be split from cable 112, such that display 110 can continue to display the video stream while display based video analytics system 302 receives and processes the video stream.

Because display based video analytics system 302 performs video analytics on the video stream without being directly connected to IP network 102 as shown in FIG. 3, display based video analytics 302 can be more readily implemented in video surveillance system 300, especially in embodiments where IP network 102 is a secure IP network. For example, because display based video analytics system 302 is decoupled from IP network 102 of video surveillance system 300, display based video analytics system 302 cannot directly receive or transmit IP packets over IP network 102, which typically prevents display based video analytics system 302 from interfering with the operation and security of IP network 102.

Figure 4:
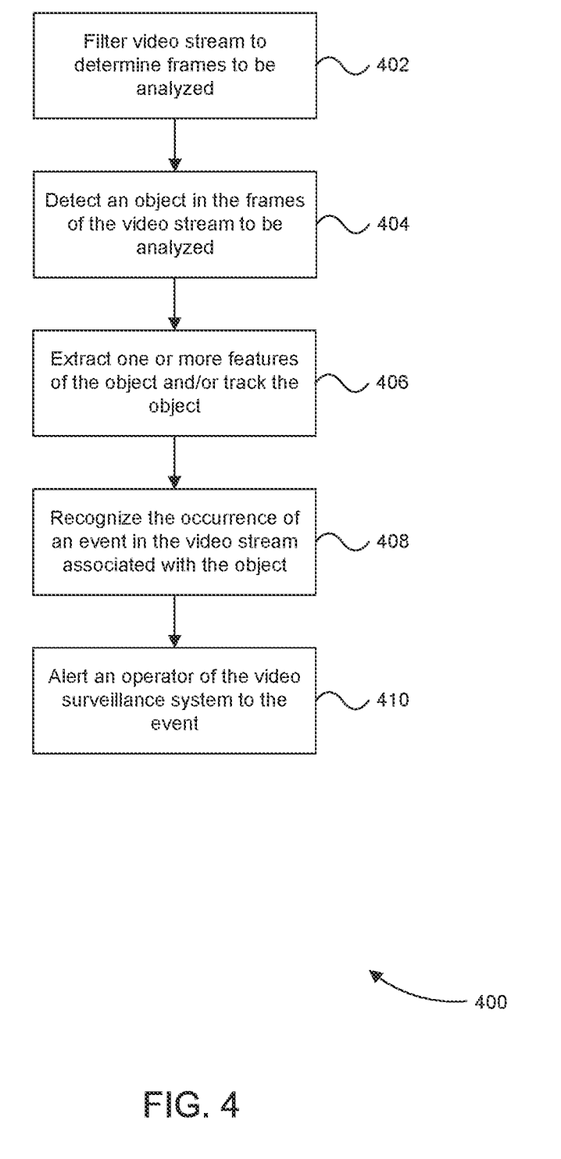
FIG. 4 illustrates a flowchart of an example method for performing video analytics on a video stream in accordance with embodiments of the present disclosure.

FIG. 4 illustrates a flowchart 400 of an example method for performing video analytics on a video stream in accordance with embodiments of the present disclosure. In one embodiment, flowchart 400 is implemented by display based video analytics system 302.

The method of flowchart 400 begins at optional step 402, where the video stream to be processed is filtered to determine frames of the video stream that are to be further analyzed. For example, the video stream can be filtered in this optional step 402 to determine frames in the video stream where a change in the environment (e.g., an object moving) captured by the video of the video stream is determined to have occurred. A change in the environment captured by the video of the video stream can be determined based on a change in color frequency distribution between temporally adjacent or temporally close video frames (e.g., video frames captured within 1 second of each other). The video frames that capture such changes in the environment can be passed forward for further analysis, while other frames can be filtered out from the additional analysis carried out in the remaining steps of flowchart 400 to reduce processing demands.

After optional step 402, the method of flowchart 400 proceeds to step 404. At step 404, video frames of the video stream are analyzed to detect an object. For example, moving objects in the video captured by the video stream can be detected using one or more known methods for detecting moving objects in video.

After step 404, the method of flowchart 400 proceeds to step 406. At step 406, features of the detected object in step 404 can be extracted for recognition and/or classification using one or more known methods. For example, if the detected object is a license plate, the numbers of the license plate can be extracted and recognized. In addition or as an alternative to extracting features of the detected object in step 404, the detected object can be tracked in the video stream at step 406 using one or more known methods. Tracking the detected object can include tracking the position and speed of the object.

After step 406, the method of flowchart 400 proceeds to optional step 408. At step 408, the video stream is analyzed to detect the occurrence of an event in the video stream that is associated with the detected object. For example, the event can be suspicious behavior associated with the detected object, such as the detected object being left behind in the environment under surveillance. Events can be detected using, for example, well known rule-based or learning-based event detection techniques.

After step 408, the method of flowchart 400 proceeds to optional step 410. At step 410, an alert is issued to the operator of the video surveillance system of the occurrence of the event recognized at step 408. The alert can be in the form of text (e.g., embedded in the video of the video stream) describing the event, a visual cue embedded in the video of the video stream that indicates or highlights the event to the video surveillance operator, and/or metadata linked to the video stream to provide a few examples.

Figure 5:
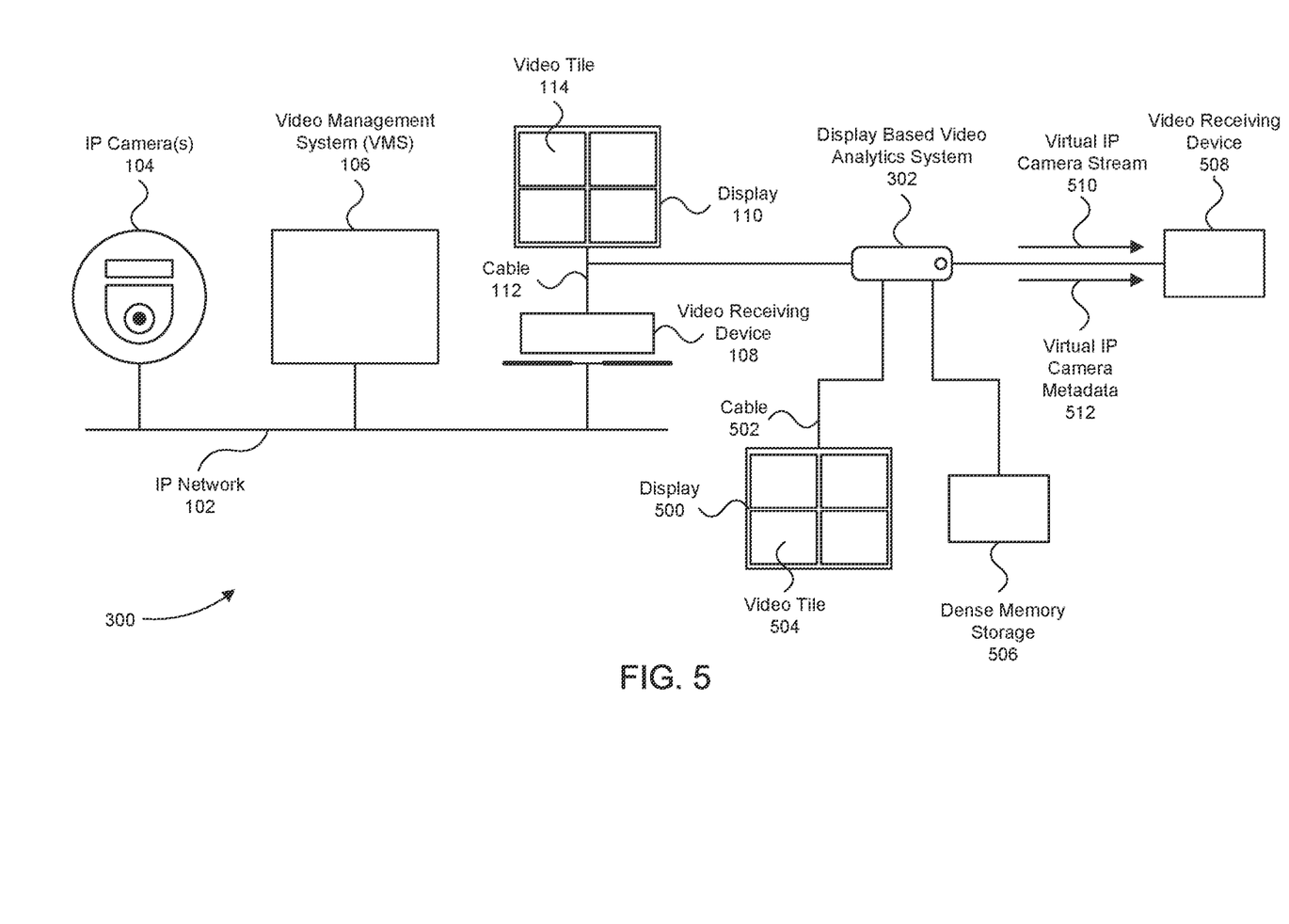
FIG. 5 illustrates local output options for a display based video analytics system in accordance with embodiments of the present disclosure.

Referring now to FIG. 5, local output options for display based video analytics system 302 are shown for video surveillance system 300 in accordance with embodiments of the present disclosure.

In a first embodiment, display based video analytics system 302 can output the original video stream on which it performed video analytics, together with the results of the video analytics, to a display 500. The video analytics results can be in the form of text (e.g., embedded in the video of the video stream) or a visual cue embedded in the video of the video stream that indicates or highlights an event recognized by the video analytics. The original video stream and video analytics results can be output to display 500 via a cable 502. Cable 502 can be, for example, a High-Definition Multimedia Interface (HDMI) display cable, a Digital Visual Interface (DVI) display cable, or a Video Graphics Array (VGA) display cable.

In the embodiment where multiple IP cameras 104 are used by video surveillance system 300, display based video analytics system 302 can format the analyzed video streams from two or more of the multiple IP cameras 104 for display in a tiled format by display 500 with corresponding video analytics results for each video stream. For example, display based video analytics system 302 can simultaneously display each video stream with its corresponding video analytics results in a separate video tile 504.

In a second embodiment, display based video analytics system 302 can output the original video stream on which it performed video analytics, together with the results of the video analytics, to a dense memory storage 506. Dense memory storage 506 can include, for example, one or more hard disk drives for storing the video data.

In a third embodiment, display based video analytics system 302 can output the original video stream on which it performed video analytics, together with the results of the video analytics, as a standard IP camera in a virtual IP camera stream 510. The virtual IP camera stream 510 can be received by another video receiving device 508, such as a VMS. In another embodiment, display based video analytics system 302 can further output, together with virtual IP camera stream 510, virtual IP camera metadata 512. Virtual IP camera metadata can include information such as vehicle types, license plate numbers, and identifying information of other objects detected or recognized by display based video analytics system 302. It should be noted that, in other embodiments, video receiving device 508 can be non-local to display based video analytics system 302.

Figure 6:
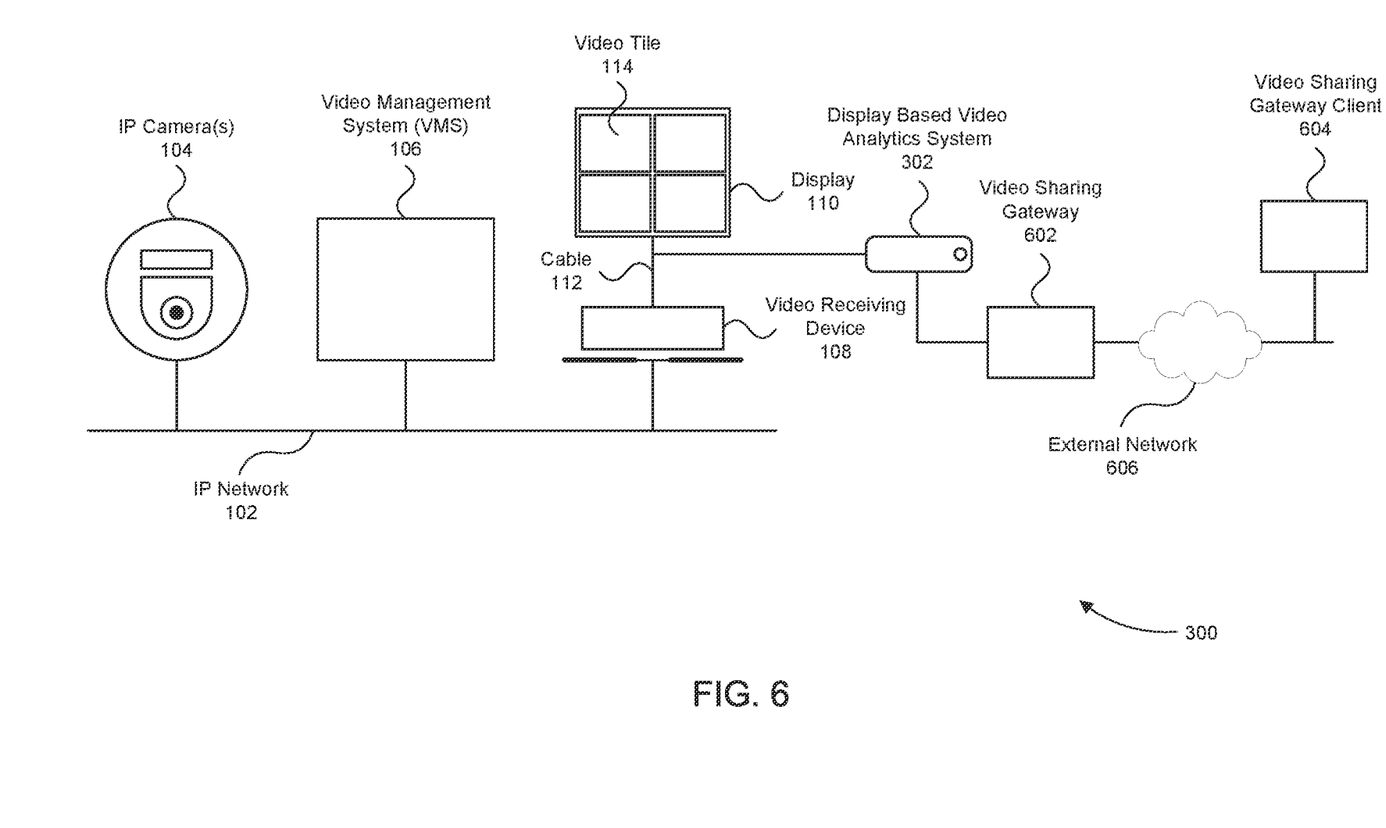
FIG. 6 illustrates a non-local output option for a display based video analytics system in accordance with embodiments of the present disclosure.

FIG. 6 illustrates a non-local output option for display based video analytics system 302 in accordance with embodiments of the present disclosure. As shown in FIG. 6, display based video analytics system 302 can output the original video stream on which it performed video analytics, together with results of the video analytics, to a video sharing gateway 602. Video sharing gateway 602 can convert the output of display based video analytics system 302 into a format suitable for transportation over external network 606 so that the output can be shared with a video sharing gateway client 604 (e.g., a PC, laptop, tablet, mobile phone, etc.). External network 606 can be, for example, a wide area network such as the Internet. In one embodiment, video sharing gateway 602 can be implemented in a similar manner and in similar settings as the Radio Network Interface Controller (RNIC) 20 described in commonly assigned U.S. Pat. No. 8,320,874, which is incorporated herein by reference.

In an embodiment, video sharing gateway client 604 includes a display (not shown) for displaying the video stream and analytics results it receives from video sharing gateway 602 over the external network 606. The video analytics results can be in the form of text (e.g., embedded in the video of the video stream) or a visual cue embedded in the video of the video stream that indicates or highlights an event recognized by the video analytics.

Figure 7:
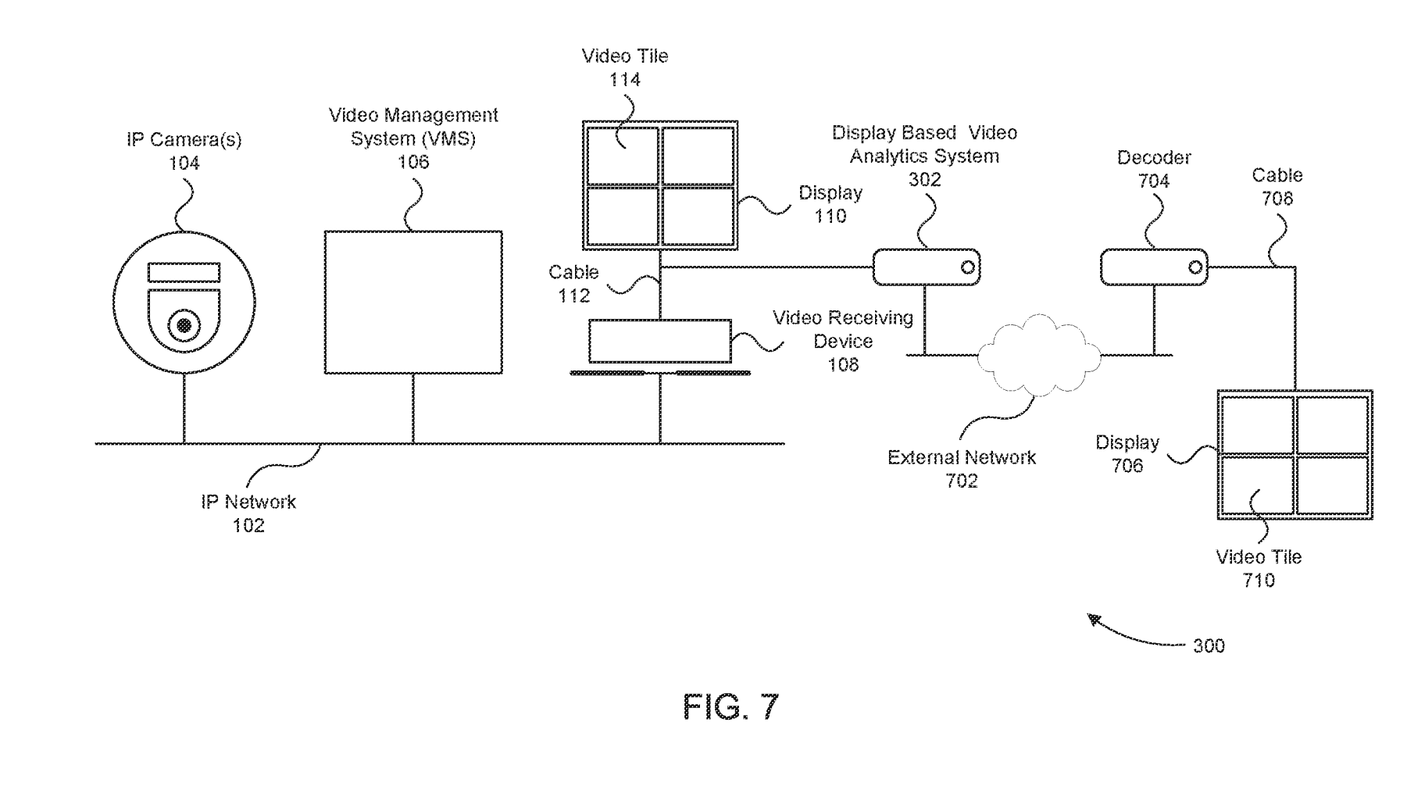
FIG. 7 illustrates another non-local output options for a display based video analytics system in accordance with embodiments of the present disclosure.

FIG. 7 illustrates another non-local output option for display based video analytics system 302 in accordance with embodiments of the present disclosure. In particular, display based video analytics system 302 can encode the original video stream on which it performed video analytics, together with results of the video analytics, for transportation over external network 702. The encoding process can be used to compress the video stream and analytics results to provide for more efficient and/or faster transportation over external network 702. Display based video analytics system 302 can also encrypt the original video stream on which it performed video analytics, together with results of the video analytics, before sending the video stream and analytics results over external network 702. External network 702 can be, for example, a wide area network such as the Internet.

On the other end of external network 702, a decoder 704 can receive the encoded video stream and analytics results from display based video analytics system 302. Decoder 704 can decode and, where necessary, decrypt the video stream and analytics results. The video analytics results can be in the form of text (e.g., embedded in the video of the video stream) or a visual cue embedded in the video of the video stream that indicates or highlights an event recognized by the video analytics. Decoder 704 can output the original video stream and video analytics results to a display 706 via a cable 708. Cable 708 can be a High-Definition Multimedia Interface (HDMI) display cable, a Digital Visual Interface (DVI) display cable, or a Video Graphics Array (VGA) display cable.

In the embodiment where multiple IP cameras 104 are used by video surveillance system 300, decoder 704 can format the analyzed video streams from two or more of the multiple IP cameras 104 for display in a tiled format by display 706 with corresponding video analytics results for each video stream. For example, decoder 704 can simultaneously display each video stream with its corresponding video analytics results in a separate video tile 710 of display 706.

4. Multi-Channel Display Based Video Analytics

Figure 8:
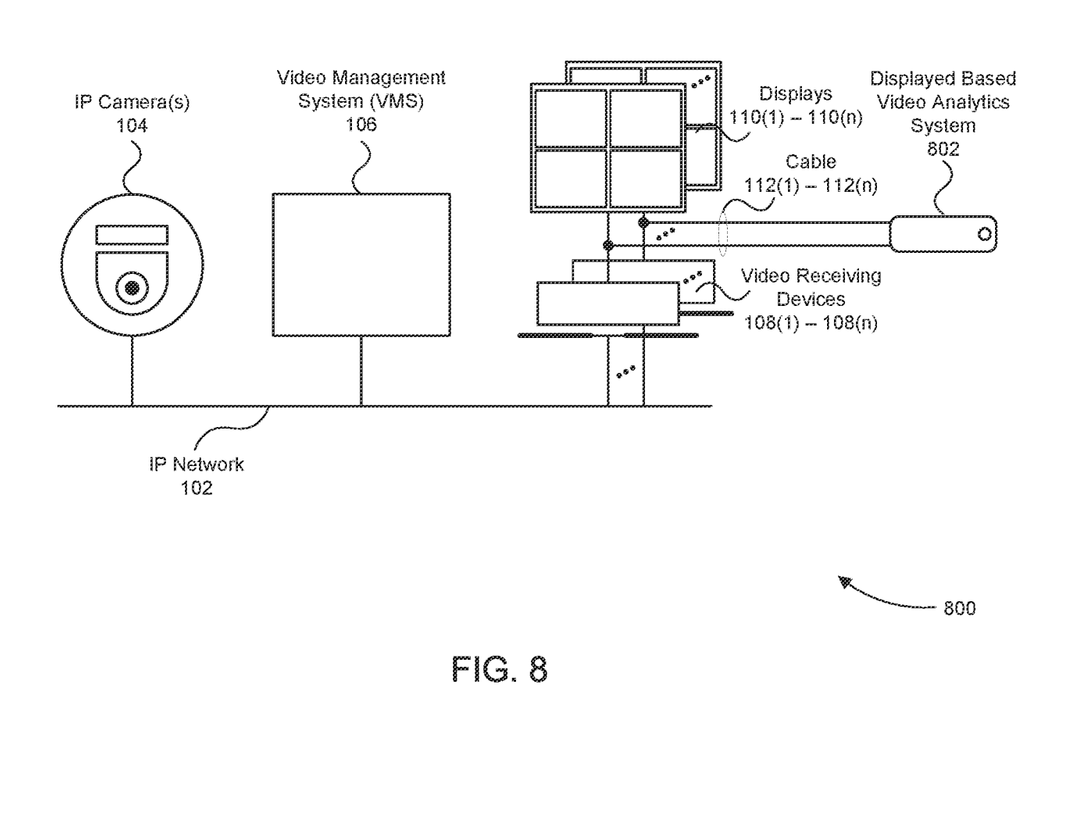
FIG. 8 illustrates a video surveillance system that implements multi-channel display based video analytics in accordance with embodiments of the present disclosure.

Referring now to FIG. 8, a video surveillance system 800 that implements display based video analytics in accordance with embodiments of the present disclosure is illustrated. Video surveillance system 800 has a similar configuration and mode of operation as video surveillance system 300 described above in regard to FIG. 3 with the exception that video surveillance system 800 at least includes multiple video receiving devices 108(1)-108(n) and a multi-channel display based video analytics system 802.

Each of the multiple video receiving devices 108(1)-108(n) are configured to process a respective video stream of captured video from at least one of IP cameras 104. As further shown in FIG. 8, each video receiving device 108(1)-108(n) is configured to process its respective video stream to provide the video stream in a format for display on one or more of optional displays 110(1)-110(n). For example, as shown in FIG. 8, video receiving device 108(1) can provide its formatted video stream to optional display 110(1) via cable 112(1). Cables 112(1)-112(n) can be High-Definition Multimedia Interface (HDMI) display cables, Digital Visual Interface (DVI) display cables, or Video Graphics Array (VGA) display cables.

Multi-channel display based video analytics system 802 receives the video streams in respective formats for displays 110(1)-110(n) via cables 112(1)-112(n). After receiving the video streams in the respective formats for displays 110(1)-110(n), multi-channel display based video analytics system 802 can perform video analytics on the video streams. For example, multi-channel display based video analytics system 802 can perform video analytics on each of the video streams in accordance with the method described above in regard to FIG. 4.

In an embodiment, multi-channel display based video analytics system 802 includes a processor (e.g., a special purpose or general purpose processor) configured to perform the video analytics on two or more of the video streams received via cables 112(1)-112(n). The processor of multi-channel display based video analytics system 802 can perform the video analytics on the two or more video streams by cycling between the video streams in time. For example, the processor of multi-channel video analytics system 802 can perform the video analytics on a first one of the two or more video streams for a first duration of time and then switch to processing a second one of the two or more video streams for a second duration of time. After processing the second one of the two or more video streams for the second duration of time, the processor of multi-channel video analytics system 802 can indefinitely repeat the process by again processing the first video stream for the first duration of time and then switching to processing the second video stream for the second duration of time.

The rate at which the processor of multi-channel video analytics system 802 continues to switch between video streams can be sufficiently fast so that information pertinent to the video analytics is not impacted. For example, the rate can be set such that the processor of multi-channel video analytics system 802 cycles through each relevant video stream received via cables 112(1)-112(n) around once per second (e.g., from 0.5 seconds to 2 seconds). It should be noted that, in some embodiments, each cable 112(1)-112(n) can carry one or more video streams upon which video analytics is to be performed.

Figure 9:
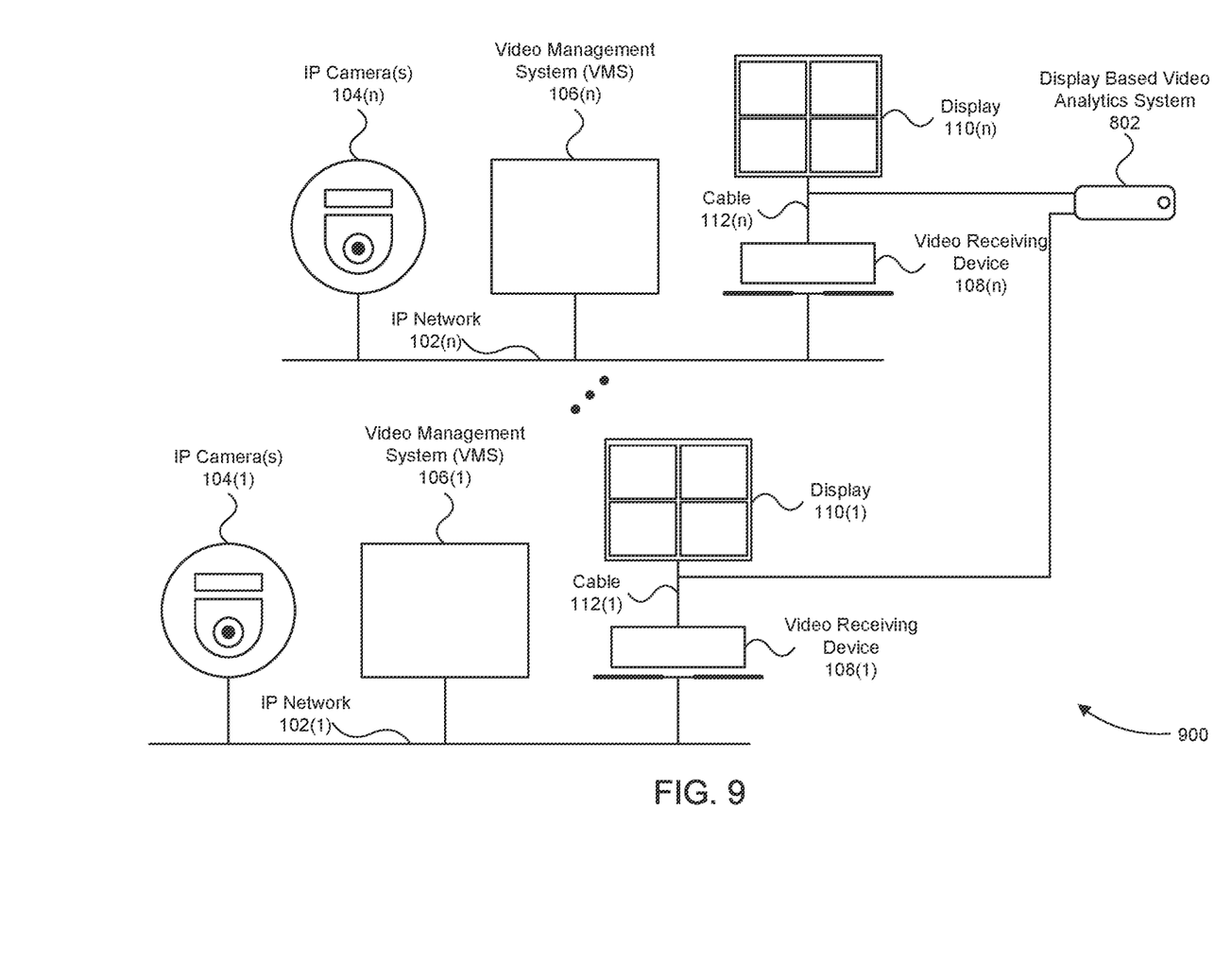
FIG. 9 illustrates another video surveillance system that implements multi-channel display based video analytics in accordance with embodiments of the present disclosure.

FIG. 9 illustrates a video surveillance system 900 that implements display based video analytics in accordance with embodiments of the present disclosure. Video surveillance system 900 has a similar configuration and mode of operation as video surveillance system 800 described above in regard to FIG. 8 with the exception that video receiving devices 108(1)-108(n) are each part of a separate video surveillance system with its own IP network 102(1)-102(n).

In an embodiment, multi-channel video analytics system 802 can detect a single object across two or more of the different video streams it receives via cables 112(1)-112(n). After detecting the object, multi-channel video analytics system 802 can track the object and/or extract features of the object from both of the video streams. Multi-channel video analytics system 802 can further recognize an occurrence of event in one or more of the video streams associated with the detected object and alert an operator of the video surveillance system to the event as described above.

5. Display Based Video Analytics Apparatus

Figure 10:
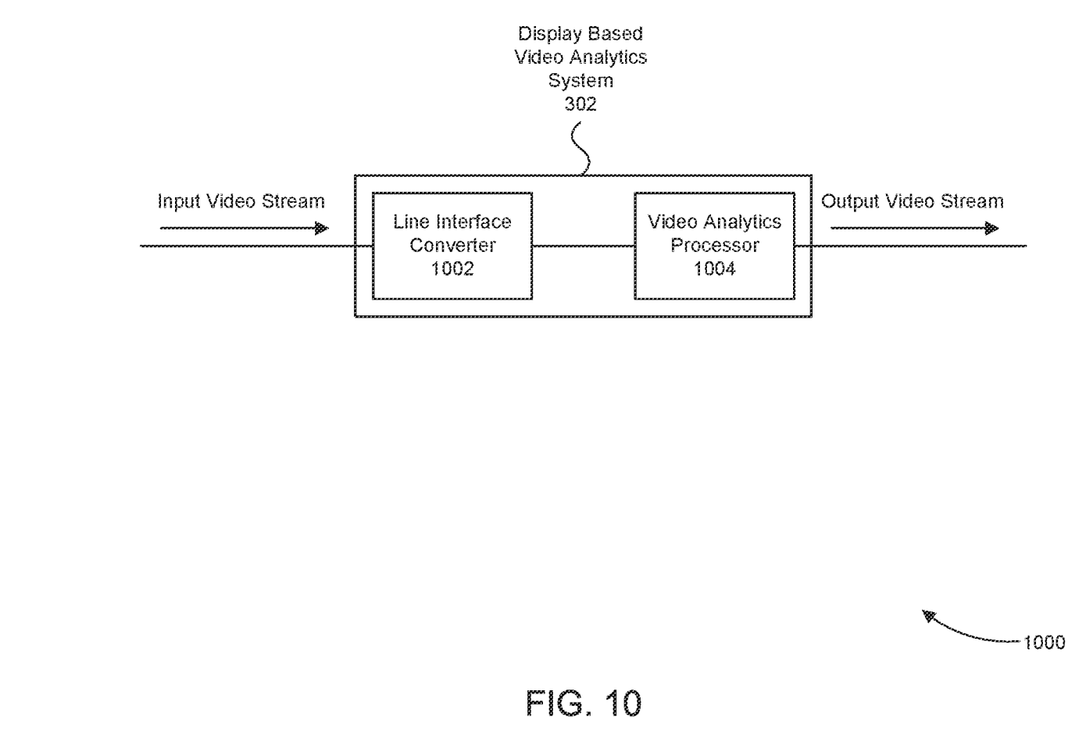
FIG. 10 illustrates an example implementation of a display based video analytics system in accordance with embodiments of the present disclosure.

Referring now to FIG. 10, an example implementation 1000 of display based video analytics system 302 is illustrated in accordance with embodiments of the present disclosure. As shown in FIG. 10, example implementation 1000 includes a line interface converter 1002 and a video analytics processor 1004.

Line interface converter 1002 can convert the input video stream from a first line interface format to a second line interface format suitable for reception by video analytics processor 1004. For example, line interface converter can receive the input video stream in an HDMI, DVI, or VGA line interface format and convert the video stream from this input line format to the line interface format used by video analytics processor 1004 (e.g., a universal serial bus (USB) line interface format).

Video analytics processor 1004 can perform video analytics on the video stream received from line interface converter 1002 as described above and provide, as output, an output video stream together with the results of the analytics processing. Several different output formats are possible as described above in regard in to FIGS. 5-7 above. Video analytics processor 1004 can include one or more general and/or special purposes processors for performing the video analytics on the input video stream. The one or more processors of video analytics processor 1004 can be implemented as one or more application specific chips (ASICs) and/or in one or more programmable logic devices, such as field programmable gate arrays (FPGAs).

It should be noted that example implementation 1000 can further be used to implement multi-channel display based video analytics system 802 in FIGS. 8 and 9 with the addition of further inputs/outputs to accommodate the multiple-channels to be processed.

6. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 11:
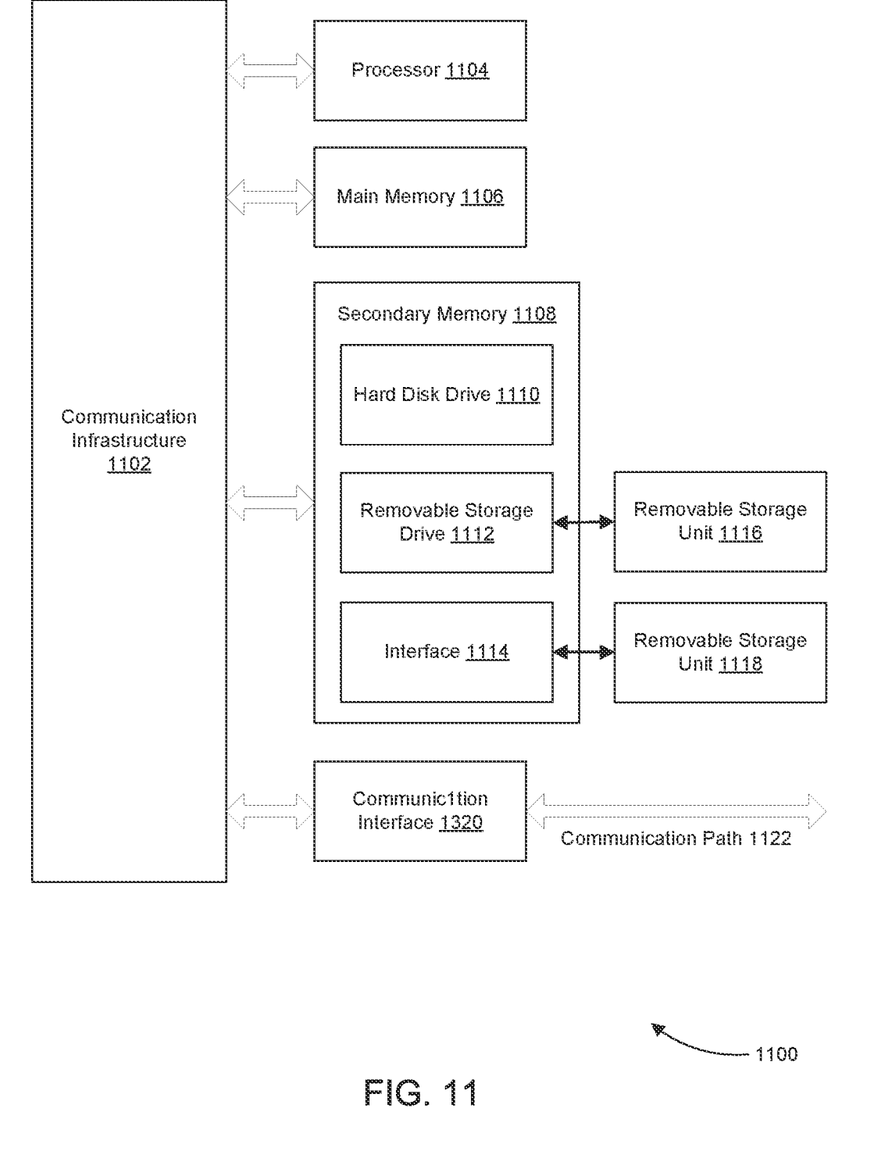
FIG. 11 illustrates a block diagram of an example computer system that can be used to implement aspects of the present disclosure The present disclosure will be described with reference to the accompanying drawings. The drawing in which an element first appears is typically indicated by the leftmost digit(s) in the corresponding reference number.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1100 is shown in FIG. 11. Blocks depicted in FIGS. 1-3 and 5-10 may execute on one or more computer systems 1100. Furthermore, each of the steps of the method depicted in FIG. 4 can be implemented on one or more computer systems 1100.

Computer system 1100 includes one or more processors, such as processor 1104. Processor 1104 can be a special purpose or a general purpose digital signal processor. Processor 1104 is connected to a communication infrastructure 1102 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1100 also includes a main memory 1106, preferably random access memory (RAM), and may also include a secondary memory 508. Secondary memory 1108 may include, for example, a hard disk drive 1110 and/or a removable storage drive 1112, representing a floppy disk drive, a magnetic tape drive, an optical disk drive, or the like. Removable storage drive 1112 reads from and/or writes to a removable storage unit 1116 in a well-known manner. Removable storage unit 1116 represents a floppy disk, magnetic tape, optical disk, or the like, which is read by and written to by removable storage drive 1112. As will be appreciated by persons skilled in the relevant art(s), removable storage unit 1116 includes a computer usable storage medium having stored therein computer software and/or data.

In alternative implementations, secondary memory 1108 may include other similar means for allowing computer programs or other instructions to be loaded into computer system 1100. Such means may include, for example, a removable storage unit 1118 and an interface 1114. Examples of such means may include a program cartridge and cartridge interface (such as that found in video game devices), a removable memory chip (such as an EPROM, or PROM) and associated socket, a thumb drive and USB port, and other removable storage units 1118 and interfaces 1114 which allow software and data to be transferred from removable storage unit 1118 to computer system 1100.

Computer system 1100 may also include a communications interface 1120. Communications interface 1120 allows software and data to be transferred between computer system 1100 and external devices. Examples of communications interface 1120 may include a modem, a network interface (such as an Ethernet card), a communications port, a PCMCIA slot and card, etc. Software and data transferred via communications interface 1120 are in the form of signals which may be electronic, electromagnetic, optical, or other signals capable of being received by communications interface 1120. These signals are provided to communications interface 1120 via a communications path 1122. Communications path 1122 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1116 and 1118 or a hard disk installed in hard disk drive 1110. These computer program products are means for providing software to computer system 1100.

Computer programs (also called computer control logic) are stored in main memory 1106 and/or secondary memory 1108. Computer programs may also be received via communications interface 1120. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1112, interface 1114, or communications interface 1120.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

7. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A non-transitory computer-readable medium storing instructions that, when executed by a processor of an electronic device, cause the processor to perform operations for a display-based video analytics system, the operations comprising:
   receiving, via a display cable, a video stream in a format for a display, wherein the video stream comprises video captured by an internet protocol (IP) camera coupled to a secure IP network,
   wherein the secure IP network complies with a first security policy, wherein the format for the display complies with a second security policy, wherein the second security policy is not in compliance with the first security policy, and
   wherein the display-based video analytics system is decoupled from the secure IP network such that the display-based video analytics system cannot directly receive or transmit IP packets over the secure IP network; and
   performing video analytics on the video stream received via the display cable.

2. The non-transitory computer-readable medium of claim 1, wherein the operations further comprise: outputting the video stream with results of the video analytics to the display or a video sharing gateway, wherein the results comprise: embedded text or a visual cue that indicates or highlights an event.

3. The non-transitory computer-readable medium of claim 1, wherein the operations further comprise: outputting the video stream in a virtual IP camera stream, wherein results of the video analytics are applied to the video stream in the virtual IP camera stream or are provided as metadata together with the virtual IP camera stream.

4. The non-transitory computer-readable medium of claim 1, wherein the operations further comprise:
   encoding the video stream and results of the video analytics applied to the video stream for transmission over an external network; or
   encrypting the video stream and the results of the video analytics applied to the video stream for transmission over the external network.

5. The non-transitory computer-readable medium of claim 1, wherein the performing video analytics on the video stream comprises:
   detecting an object in the video stream in the format for the display;
   tracking the object in the video stream in the format for the display; and
   extracting one or more features of the object for classification of the object or to recognize the one or more features of the object.

6. The non-transitory computer-readable medium of claim 1, wherein the performing video analytics on the video stream comprises:
   detecting an object in the video stream in the format for the display; and
   recognizing an occurrence of an event associated with the object, in the video stream in the format for the display.

7. The non-transitory computer-readable medium of claim 6, wherein the operations further comprise: issuing an alert including: a video cue embedded in the video stream that highlights the event, or metadata linked to the video stream.

8. A method for a display-based video analytics system, comprising:
   receiving, via a display cable, a video stream in a format for a display, wherein the video stream comprises video captured by an internet protocol (IP) camera coupled to a secure IP network, wherein the secure IP network complies with a first security policy, wherein the format for the display complies with a second security policy, wherein the second security policy is not in compliance with the first security policy, and wherein the display-based video analytics system is decoupled from the secure IP network such that the display-based video analytics system cannot directly receive or transmit IP packets over the secure IP network; and performing video analytics on the video stream received via the display cable.

9. The method of claim 8, further comprising: outputting the video stream with results of the video analytics to the display or a video sharing gateway, wherein the results comprise: embedded text or a visual cue that indicates or highlights an event.

10. The method of claim 8, wherein performing video analytics on the video stream further comprises:
    encoding the video stream and results of the video analytics applied to the video stream for transmission over an external network; or
    encrypting the video stream and the results of the video analytics applied to the video stream for transmission over the external network.

11. The method of claim 8, wherein the performing video analytics on the video stream comprises:
    detecting an object in the video stream in the format for the display;
    tracking the object in the video stream in the format for the display; and
    extracting one or more features of the object for classification of the object or to recognize the one or more features of the object.

12. The method of claim 8, wherein the performing video analytics on the video stream comprises:
    detecting an object in the video stream; in the format for the display; and
    recognizing an occurrence of an event associated with the object, in the video stream in the format for the display.

13. The method of claim 12, further comprising: issuing an alert including: a video cue embedded in the video stream that highlights the event, or metadata linked to the video stream.

14. A system for a display-based video analytics system, comprising:
    a memory; and
    one or more processors coupled to the memory, configured to:
        receive, via a first display cable, a first video stream in a first format for display, wherein the first video stream comprises first video captured by a first internet protocol (IP) camera coupled to a first secure IP network,
        wherein the first secure IP network complies with a first security policy, wherein the first format for display complies with a second security policy, wherein the second security policy is not in compliance with the first security policy;
        receive, via a second display cable, a second video stream in a second format for display, wherein the second video stream comprises second video captured by a second internet protocol (IP) camera coupled to a second secure IP network, and
        wherein the display-based video analytics system is decoupled from the first secure IP network and the second secure IP network such that the display-based video analytics system cannot directly receive or transmit IP packets via the first secure IP network or the second secure IP network; and
        perform video analytics on the first video stream received via the first display cable and the second video stream received via the second display cable.

15. The system of claim 14, wherein to perform the video analytics, the one or more processors are configured to:
    detect an object across video frames of the first video stream and the second video stream; and
    track the object of both the first video stream and the second video stream.

16. The system of claim 15, wherein the one or more processors are further configured to:
    recognize an occurrence of an event associated with the detected object; and
    issue an alert comprising: a video cue embedded in the first and the second video streams that highlights the event, or metadata linked to the first and the second video streams.

17. The system of claim 14, wherein to perform the video analytics, the one or more processors are configured to: cycle in time between the first video stream and the second video stream.

18. The system of claim 14, wherein the one or more processors are further configured to:
    format the first video stream and first results of the video analytics applied to the first video stream to a first tile of a display coupled to the display-based video analytics system; and
    format the second video stream and second results of the video analytics applied to the second video stream to a second tile of the display.

19. The system of claim 14, wherein the one or more processors are further configured to: output the first video stream and the second video stream with results of the video analytics to a display or a video sharing gateway, wherein the results comprise: embedded text or a visual cue that indicates or highlights an event.

20. The system of claim 14, wherein the one or more processors are further configured to:
    encode the video stream and results of the video analytics applied to the video stream for transmission over an external network; or
    encrypt the video stream and the results of the video analytics applied to the video stream for transmission over the external network.

* * * * *